United States Patent [19]

Genter et al.

[11] Patent Number: 4,805,668

[45] Date of Patent: Feb. 21, 1989

[54] BRAKE FLUID CONTAINER

[75] Inventors: Gerhard Genter, Hemmingen; Edgar Schmitt, Vaihingen; Hans-Dieter Siems, Eberdingen-Nussdorf, all of Fed. Rep. of Germany

[73] Assignee: Robert Bosch GmbH, Stuttgart, Fed. Rep. of Germany

[21] Appl. No.: 188,321

[22] Filed: May 4, 1988

[30] Foreign Application Priority Data

Jun. 24, 1987 [DE] Fed. Rep. of Germany ....... 3724802

[51] Int. Cl.[4] .................. B60T 11/20; B60T 17/22
[52] U.S. Cl. ................................. 137/558; 60/535; 60/592
[58] Field of Search ................. 137/558; 60/534, 535, 60/592

[56] References Cited

U.S. PATENT DOCUMENTS

| 3,593,271 | 7/1971 | Schrader | 340/59 |
|---|---|---|---|
| 3,744,513 | 7/1973 | Leitenberger | 137/255 |
| 4,136,712 | 1/1979 | Nogami et al. | 137/558 |
| 4,168,613 | 9/1979 | Nakagawa et al. | 60/592 X |
| 4,181,147 | 1/1980 | Fujii et al. | 60/592 X |
| 4,192,345 | 3/1980 | Fujii et al. | 60/592 X |
| 4,289,162 | 9/1981 | Nomura | 60/535 X |
| 4,337,792 | 7/1982 | Nomura | 137/558 |
| 4,355,512 | 10/1982 | Kubota et al. | 60/534 |
| 4,602,482 | 7/1986 | Kubota et al. | 60/592 X |

FOREIGN PATENT DOCUMENTS

| 2555867 | 7/1976 | Fed. Rep. of Germany | 60/535 |
|---|---|---|---|
| 3038947 | 4/1981 | Fed. Rep. of Germany | . |
| 966556 | 8/1964 | United Kingdom | 60/534 |

Primary Examiner—John Rivell
Attorney, Agent, or Firm—Edwin E. Greigg

[57] ABSTRACT

In a brake fluid container for hydraulic motor vehicle brake systems having a housing with a fill connector a container cap closing off the fill connector, a filling filter suspended in the fill connector and protruding into the housing interior, and a level switch secured to the container cap for indicating a minimum allowable fill level in the housing in order to attain extensive damping of a float of the level switch with respect to fluid fluctuations caused by vehicle behavior, the filling filter is embodied as a closed float chamber, extending to below the minimum allowable fill level in the housing with guides for the float. On its lower end, the filling filter is provided with a throttle bore located near the minimum allowable fill level and in a region near the maximum fill level, it is provided with filter windows for the sake of rapid filling of the housing with fluid.

20 Claims, 3 Drawing Sheets

BRAKE FLUID CONTAINER

BACKGROUND OF THE INVENTION

The invention is directed to improvements in brake fluid containers for hydraulic brake systems in motor vehicles.

Such containers serve as the fluid reservoir for two or more separate brake circuits of the brake system, with the chambers associated with the individual brake circuits being filled in common via a fill connector. A single level switch detects the fill level in the container and emits a visual and/or acoustical signal if the fluid level drops to a predetermined minimum value. The container either communicates with the master brake cylinder of the brake system via lines, or else is united directly with it.

In a known brake fluid container of this type (U.S. Pat. No. 4,337,792), the level switch, which includes an electrical switch contact and a float actuating the switch and plunging into the brake fluid, is secured to the container cap that closes off the fill connector; if the container cap is removed, to fill or refill the container with brake fluid, the level switch is pulled out of the fill connector. The fill connector is closed off to make two separate chambers by means of a single cup-like fluid filter, which is inserted into the fill connector and prevents soil particles from entering the two fluid chambers along with the brake fluid. The float is axially displaceably mounted on a rod secured to the container cap and assumes a position in accordance with the fill level in the fill connector; the float magnetically closes a switch contact when the lowest allowable point of the fluid level is reached.

A level switch of this kind is vulnerable to severe fluctuations in the brake fluid in the container, which occur during cornering and upon major acceleration and braking of the vehicle. In such cases, the level switch often consequently closes and produces annoying readings.

In another known brake fluid container (German Pat. No. 30 38 947) the level switch is disposed in a chamber that is separate from but communicates with the other chambers. The float is displaceably guided on a rod that is secured to a cap closing off an opening in the chamber. The switch chamber, defined by especially shaped walls, is disposed in the central, middle region of the housing, to minimize the effects of inclination, acceleration or braking on the fluid level in the switch chamber.

OBJECT AND SUMMARY OF THE INVENTION

The brake fluid container according to the invention has an advantage that embodying the filling filter as a float chamber damps the float so extensively, without requiring additional components in the container, that brief fluctuations in the fluid level in the container caused by the aforementioned events such as cornering, acceleration and braking do not affect the float. The communication between the interior of the float chamber and the other chambers that the throttle bore provides allows only a slow equalization of fluid, so that brief dynamic fluctuations in the fluid level in the various chambers do not affect the float chamber. The guidance of the float and the relatively small fluid volume in the float chamber keep the fluctuations of the fluid level in the interior of the float chamber itself relatively slight, so that they do not notably displace the float. Even under extreme conditions, such as fast cornering, major acceleration or hard braking, the level switch cannot respond as long as the fluid level is still adequate. The embodiment of the level switch is simple, because the float is guided in the chamber itself and is capable, via a switch rod rigidly connected to it, of actuating the electric switch contact directly.

The filter cloth upstream of the throttle bore prevents soil particles from entering the throttle and through it the fluid chambers.

Rapid filling of the container with brake fluid is possible because a filter window is provided that opens up a large opening cross section to the other fluid chambers. The filter cloth covering the filter window or windows prevents the entry of entrained soil particles, so that the float chamber covering the fill connector continues to perform its function as a filter or soil trapping screen. In order not to impair the damping action of the throttle bore, the filter window is disposed in the region of the maximum fluid level in the container, its upper edge simultaneously serving as the maximum allowable container fill level mark.

Guides embodied as ribs prevent the float from sticking to the inner wall of the float chamber because of boundary layer and surface tensions, thus enabling a largely low-friction sliding of the float in the float chamber.

At least one further flow opening in the float chamber, disposed above the maximum fill level, enables equalization of air pressure between the chambers that communicate with one another and the float chamber, and in a simple manner allows venting of the container interior, if the container cap is provided with a throttle bore leading to the outside and serving as a vent.

To prevent splashing water from entering through the throttle bore, this bore discharges not directly at the outside of the container cap but instead into a conduit that extends on the inside of the cap and in turn discharges on the underside, facing the container, of the container cap, in the portion of the cap that protrudes beyond the fill connector.

The invention will be better understood and further objects and advantages thereof will become more apparent from the ensuing detailed description of a preferred embodiment taken in conjunction with the drawings.

BRIEF DESCRIPTION OF THE PREFERRED EMBODIMENT

DESCRIPTION OF THE PREFERRED EMBODIMENT

Figure 1:
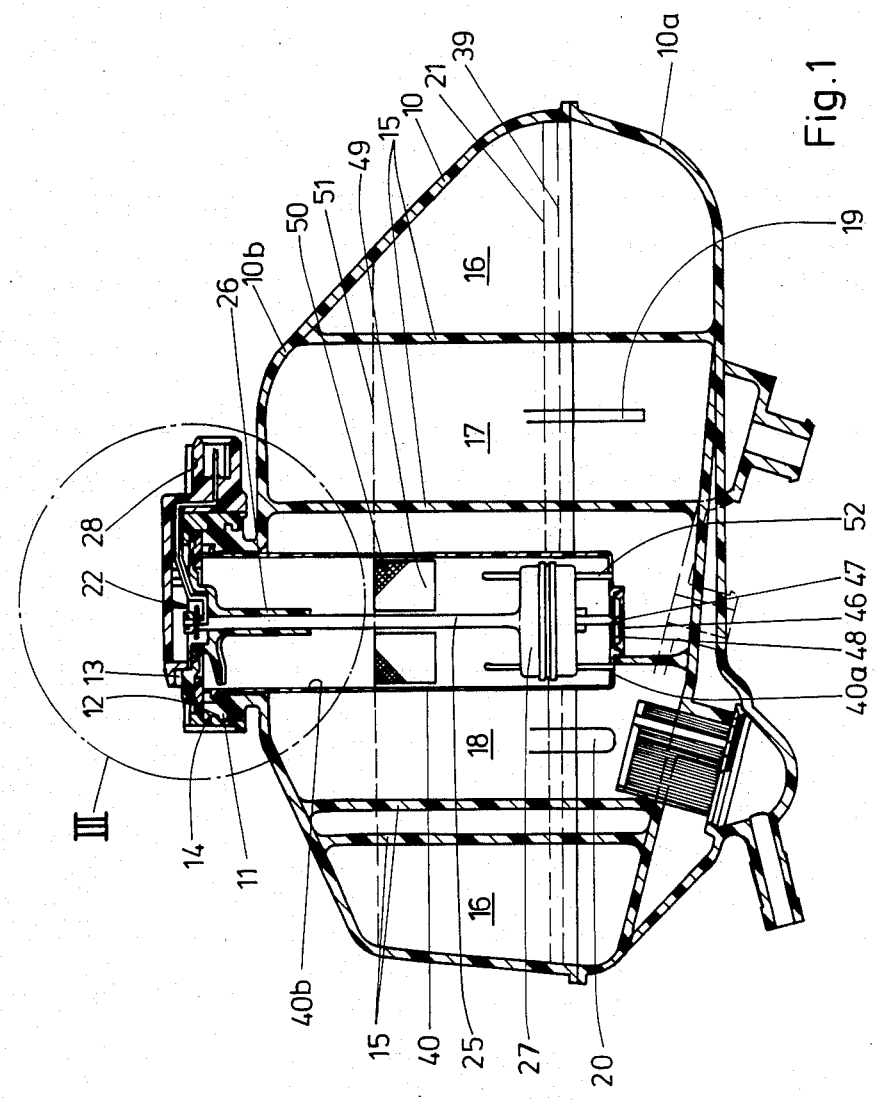
FIG. 1 is a longitudinal section through a brake fluid container having a total of three fluid chambers.

The brake fluid container shown in longitudinal section in FIG. 1 serves to supply a master brake cylinder, having two separate brake circuits and one servo circuit, of a motor vehicle brake system. The container has a plastic housing 10 having an upwardly protruding fill connector 11. The fill connector 11 is provided with an external thread 12, on which a plastic container cap 13, hereinafter simply called the cap 13, can be screwed with an internal thread 14 to close off the fill connector 11.

The interior of the housing 10 is divided by means of partitions 15, which extend from the housing floor 10a to the housing ceiling 10b, into three chambers 16, 17, 18 separate from one another. The chambers 16–18 communicate with one another via so-called overflows, which extend from the housing ceiling 10b to a certain distance from the housing floor 10a and thus, above a certain level, permit the exchange of fluid between the chambers 16–18. The height and position of these overflows depends on the residual volume required by a system supplied from one of the chambers in the event of failure of one or both of the other systems and on peripheral geometrical conditions, such as the external contour and the angle at which the housing 10 is mounted. The overflows connecting the chambers 17 and 18 are shown at 19 and 20 in FIG. 1. The other overflows are not visible there. If there is enough fluid in the housing 10, the overflows assure that the same fluid level will prevail in each chamber 16–18.

Figure 3:
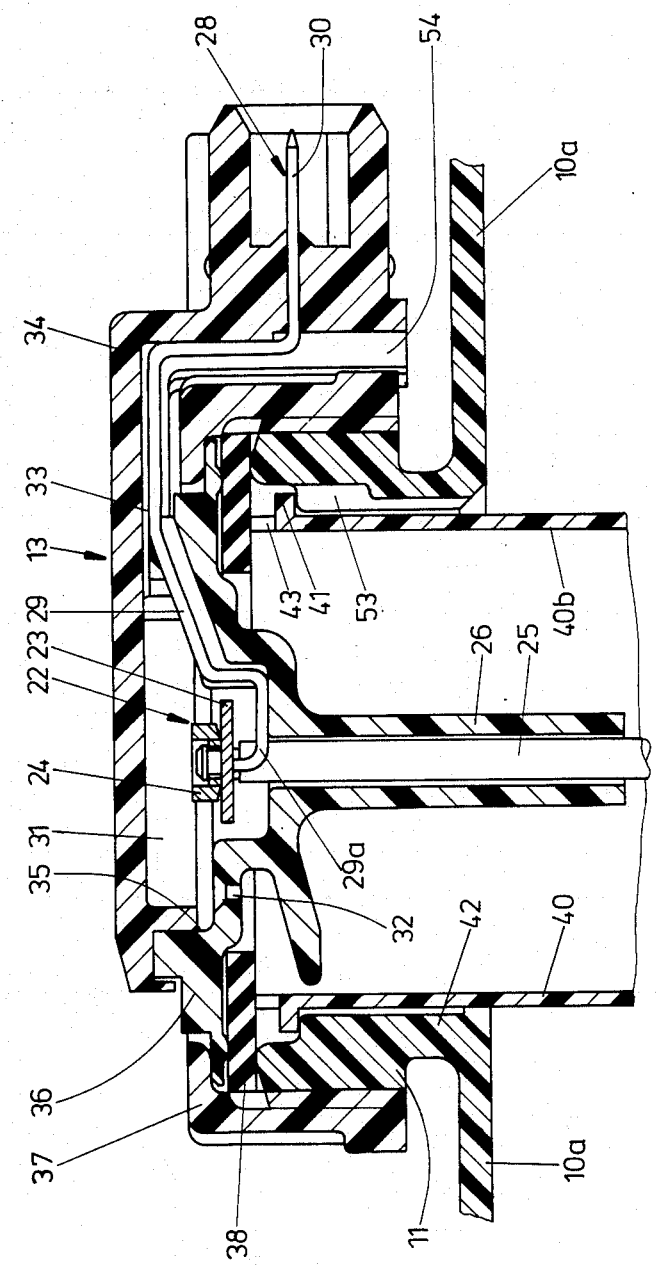
FIG. 3 shows the detail of portion III of FIG. 1 on a larger scale.

To detect a minimum allowable fluid level in the housing 10, a level switch 22 is provided, which is secured to the cap 13 closing off the fill connector 11. The level switch 22 has two fixed contact prongs 29a (see FIG. 3) and a movable contact plate 23, secured to a switch rod 25 by means of a retaining disk 24. The switch rod 25 is vertically displaceably guided in a short guide sleeve 26, protruding vertically from the cap 13, and on its end has a float 27 that plunges into the fluid in the interior of the housing. Via electrical connecting lines, the contact prongs 29a are connected with a plug 28, to which a visual and/or acoustical warning device is connected. The one electrical connecting line that is visible between the one contact prong 29a and the plug 28 is indicated at 29, and the associated plug pin is shown at 30. When the float 27 sinks, the contact plate 23 rests on the two contact prongs 29a and closes the normally opened current circuit. Above the contact assembly 23, 29a of the level switch 22, the cap 13 has a hollow space 31, which communicates via a throttle opening 32 with the interior of the fill connector 11. Discharging into the hollow space 31 is a conduit 33, which penetrates the cap 13 and, via a gap 54 on the plug 28, discharges directly at the plug 28 on the underside of the cap 13, in its portion that protrudes beyond the fill connector 11. For manufacturing reasons, the hollow space 31 and the conduit 33 are integrated with the plug 28 as a separate plastic component 34, which is welded in place in a central opening 35 in the remaining portion of the cap. This remaining portion of the cap is in turn embodied in two parts: a supporting part 36, and a screw part 37 encompassing it in the manner of a union nut. The screw part 37 has the internal thread 14 and clamps the supporting part 36, via a sealing washer 38, onto the end face of the fill connector 11.

A filling filter 40 is inserted into the fill connector 11 and at the same time is embodied as a float chamber for the float 27 of the level switch 22. The cup-shaped filling filter 40 is a closed plastic sleeve with a one-piece bottom, with a suspension flange 41 on its upper rim. When the filling filter 40 is inserted, the suspension flange 41 fits over the upper end of a filter holder 42, which protrudes radially from the inner wall of the fill connector 11, so that on the one hand the suspension flange 41 is suspended on the filter holder 42 and on the other hand the filter holder 42 serves as an additional guide for the filling filter 40. The distance spacing the filter holder 42 apart from the end face of the fill connector, and the distance spacing the suspension 41 apart from the upper face end of the filling filter 40, are adapted to one another such that when the cap 13 is screwed on, the sealing washer 38 resting on the face end of the fill connector 40 presses the suspension flange 41 onto the filter holder 42 and thus fixes the filling filter 40 in an axially immovable manner. Above the suspension flange 41 in the wall of the filling filter 40, flow openings 43 are provided, which establish communication between the interior of the filling filter 40 and the interior of the fill connector 11, and hence to the chamber 16 into which the fill connector 11 discharges directly. A total of four flow openings 43 are distributed uniformly over the circumference of the filling filter 40.

Figure 2:
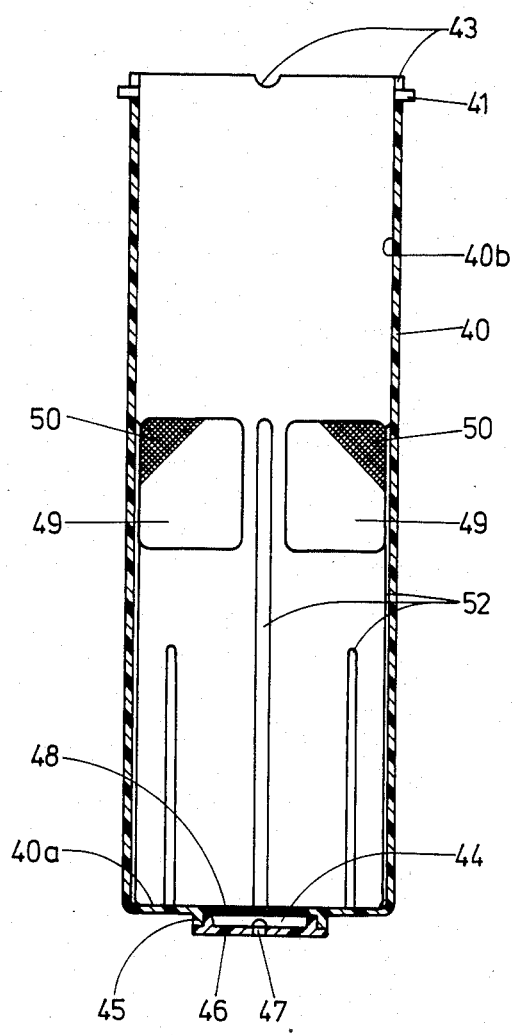
FIG. 2 is an enlarged sectional view of the filling filter in the container of FIG. 1.

The filling filter 40 has a length such that it extends to below the minimum allowable fill level in the housing 10. This minimum fill level is shown in dot-dash lines at 39 in FIG. 1. The line 21 extending parallel to this minimum fill level line 39 and also shown in dot-dash lines represents the fluid level at which the float 27 of the level switch 22 has risen enough that the contact plate lifts from the contact prong 29a and thus switches off the warning device. In the bottom 40a of the filling filter 40 located below the minimum fill level 39, a central opening 44 (see FIG. 2) is provided, which is surrounded by an annular collar 45 protruding from the underside of the bottom 40a. A covering disk 46 provided with a throttle bore 47 is welded into the annular collar 45. The opening 44 is covered with a filter cloth 48, which is preferably injected into the bottom 40a of the filling filter 40.

At a distance from the bottom 40a of the filling filter 40, near the maximum fill level in the housing 10, the filling filter 40 is provided with four filter windows 49 distributed uniformly over the circumference of the filling filter 40. The filter windows 49 are covered with a filter cloth 50, which is produced by injection in the process of injection molding of the filling filter 40. The upper edges of the filter windows 49 are arranged such that they coincide with the maximum fill level 51 in the housing 10, so that they serve at the same time as an indicator marking for the maximum fill level when brake fluid is being poured into the fill connector 11. The filter windows 49 have a relatively large cross section, so that the fluid poured into the filling filter 40 can flow rapidly into the chamber 16 via the filter windows 49. As a result, the closed filling filter 40 embodied as a float chamber does not slow down the filling process.

The float 27, the outside diameter of which is slightly smaller than the inside diameter of the filling filter 40, is retained axially displaceably between guides that are embodied as ribs 52, protruding radially from the inner wall 40b of the filling filter 40 and extending axially as far as the bottom 40a. A total of eight ribs 52 are distributed uniformly in the circumferential direction. The radial protrusion of the ribs 52 is less than 1 mm. This slight distance between the float 27 and the inner wall 40b of the filling filter 40 is already sufficient to prevent the float 27 from sticking to the inner wall 40b of the filling filter 40 because of boundary layer tension and surface tension.

Venting of the chambers 16–18 is effected via three venting grooves 53 on the inner wall of the fill connector 11. These venting grooves 53 are uniformly distributed over the inner wall of the fill connector 11 and divide the filter holder 42 into three identical retaining segments. Via these venting grooves 53 and the flow openings 43 on the upper rim of the filling filter 40, the chamber 16 of the housing 10 communicates with the interior of the filling filter 40. Since the throttle bore 32 discharges here, the interior of the filling filter 40 communicates with the atmosphere, via the hollow space 31, the conduit 33 in the cap 13 and the gap 54 on the switch 28. Since the chambers 16–18 communicate with one another via the overflows, the chambers 17 and 18 are vented via this route as well. Providing for the discharge of the venting conduit 33, 54 on the underside of the cap 13 prevents splashing water from getting in. The filter cloths 48 and 50 prevent soil particles from entering the chambers 16–18 when the container is being filled, so that the brake fluid reaching the various brake systems is largely uncontaminated with soil.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A brake fluid container for a hydraulic brake system for a motor vehicle, comprising a housing having an interior with a housing floor and a housing ceiling, a fill connector in said ceiling, the housing having at least two chambers communicating with one another at a predetermined height above the housing floor, a filling filter suspended from said fill connector and protruding into the housing interior, a container cap closing off said fill connector, a level switching secured to said container cap for indicating a minimum allowable fill level in the housing interior, said level switch having a float that plunges into said filling filter and an electrical switch contact actuated by said float, said filling filter (40) being embodied as an enclosed float chamber extending from said fill connector to below the minimum allowable fill level, said float including float chamber guides (52) for guiding said float (27), a throttle bore (47) being disposed on the lower end of said filling filter (40) below the minimum allowable fill level (39) and preferably in the bottom (40a) of the filling filter (40).

2. A container as defined by claim 1, in which said throttle bore (47) is covered toward the interior of the filling filter (40) by a filter cloth (48) secured on the bottom (40a) of the filling filter (40).

3. A container as defined by claim 1, in which said filling filter (40) has at least one filter window (49) provided with a filter cloth (50) near the maximum fill level (51) in the housing (10).

4. A container as defined by claim 2, in which said filling filter (40) has at least one filter window (49) provided with a filter cloth (50) near the maximum fill level (51) in the housing (10).

5. A container as defined by claim 3, in which said filter window (49) includes an upper edge embodied as an indicator marking for the maximum fill level (51).

6. A container as defined by claim 4, in which said filter window (49) includes an upper edge embodied as an indicator marking for the maximum fill level (51).

7. A container as defined by claim 1, in which said float guides are embodied as circumferentially spaced axially extending ribs (52) protruding radially on the inner wall (40b) of the filling filter (40).

8. A container as defined by claim 1, in which said filling filter is embodied as cup-shaped with an inside diameter slightly larger than an outside diameter of said float (27) said filling filter including in the vicinity of its upper rim located above a maximum allowable fill level (51) a suspension flange (41) for resting on a filter holder (42) protruding radially in the fill connector (11), and a distance of the filter holder (42) from the face end of the fill connector (11) and a distance of the suspension flange (41) from the open rim of the filling filter (40) are adapted to one another such that the suspension flange (41) is retained virtually without play between the filter holder (42) and the container cap (13).

9. A container as defined by claim 2, in which said filling filter is embodied as cup-shaped with an inside diameter slightly larger than an outside diameter of said float (27), said filling filter including in the vicinity of its upper rim located above a maximum allowable fill level (51) a suspension flange (41) for resting on a filter holder (42) protruding radially in the fill connector (11), and a distance of the filter holder (42) from the face end of the fill connector (11) and a distance of the suspension flange (41) from the open rim of the filling filter (40) are adapted to one another such that the suspension flange (41) is retained virtually without play between the filter holder (42) and the container cap (13).

10. A container as defined by claim 3, in which said filling filter is embodied as cup-shaped with an inside diameter slightly larger than the outside diameter of said float (27), said filling filter including in the vicinity of its upper rim located above a maximum allowable fill level (51) a suspension flange (41) for resting on a filter holder (42) protruding radially in the fill connector (11), and a distance of the filter holder (42) from the face end of the fill connector (11) and a distance of the suspension flange (41) from the open rim of the filling filter (40) are adapted to one another such that the suspension flange (41) is retained virtually without play between the filter holder (42) and the container cap (13).

11. A container as defined by claim 5, in which said filling filter is embodied as cup-shaped with an inside diameter slightly larger than the outside diameter of said float (27) said filling filter including in the vicinity of its upper rim located above a maximum allowable fill level (51) a suspension flange (41) for resting on a filter holder (42) protruding radially in the fill connector (11), and a distance of the filter holder (42) from the face end of the fill connector (11) and a distance of the suspension flange (41) from the open rim of the filling filter (40) are adapted to one another such that the suspension flange (41) is retained virtually without play between the filter holder (42) and the container cap (13).

12. A container as defined by claim 7, in which said filling filter is embodied as cup-shaped with an inside diameter slightly larger than the outside diameter of said float (27) said filling filter including in the vicinity of its upper rim located above a maximum allowable fill level (51) a suspension flange (41) for resting on a filter holder (42) protruding radially in the fill connector (11), and a distance of the filter holder (42) from the face end of the fill connector (11) and a distance of the suspension flange (41) from the open rim of the filling filter (40) are adapted to one another such that the suspension flange (41) is retained virtually without play beteween the filter holder (42) and the container cap (13).

13. A container as defined by claim 8, in which said filling filter (40) has at least one flow opening (43) disposed on its upper open rim, which opening communicates with an axially continuous venting groove (53) extending in an inner wall of said fill connector (11) and discharges into at least one chamber.

14. A container as defined by claim 13, in which said container cap (13) has a throttle bore (32) which connects an underside of said cap that closes off the fill connector (11) with a conduit (31, 33) extending in the container cap, and the conduit (31, 33) discharges on the underside of the container cap (13) in a portion thereof protruding beyond the fill connector (11).

15. A container as defined by claim 1, in which said fill connector (11) discharges in one of said chambers, and the filling filter (40) protrudes freely into this chamber.

16. A container as defined by claim 2, in which said fill connector (11) discharges in one of said chambers, and the filling filter (40) protrudes freely into this chamber.

17. A container as defined by claim 3, in which said fill connector (11) discharges in one of said chambers, and the filling filter (40) protrudes freely into this chamber.

18. A container as defined by claim 13, in which said fill connector (11) discharges in one of said chambers, and the filling filter (40) protrudes freely into this chamber.

19. A container as defined by claim 14, in which said fill connector (11) discharges in one of said chambers, and the filling filter (40) protrudes freely into this chamber.

20. A container as defined by claim 1, in which said chambers (16–18) include fluid communication passages located on a level below the minimum allowable fill level (39) in the housing (10), and the filling filter (40) extends to approximately the beginning of the communication level.

* * * * *